United States Patent [19]
Jette

[11] Patent Number: 5,085,203
[45] Date of Patent: Feb. 4, 1992

[54] MOVABLE GRILL FOR A BARBECUE

[76] Inventor: Claude Jette, 104 Confederation Drive, Apt. 1001, St. Thomas, Ontario, Canada, N5P 4C1

[21] Appl. No.: 641,128

[22] Filed: Jan. 11, 1991

[51] Int. Cl.⁵ .................................................. F24C 3/00
[52] U.S. Cl. .............................. 126/41 R; 126/25 R; 99/450
[58] Field of Search .............. 126/25 R, 41 R; 99/450

[56] References Cited
U.S. PATENT DOCUMENTS 4,432,334  2/1984  Holt ................................... 126/25 R
4,510,855  4/1985  Avner ................................ 126/25 R Primary Examiner—Carroll B. Dority
Attorney, Agent, or Firm—Mitches & Co.

[57] ABSTRACT

In barbecuing, food generally sticks to a fixed grill rack. This invention provides means for keeping the food "unstuck" while cooling and this is achieved by moving two adjacently disposed grilling racks, one having a fixed elevation relative to the underlying coals, the other relatively movable from a plane beneath that of the fixed rack to a plane above the fixed rack, thereby causing the food to move between movable rack and fixed rack, keeping the food "unstuck".

7 Claims, 2 Drawing Sheets

MOVABLE GRILL FOR A BARBECUE

This invention relates to a movable grill for a barbecue.

Barbecue cooking has become a most popular event, particularly for steak and hamburgers.

BACKGROUND TO THE INVENTION

Present barbecuing techniques do not allow one to cook fried fish to a golden yellow colour without using special aids such as, a rotary basket or the like, since the fish generally "sticks" to the grill and it is virtually impossible to turn it over half-cooked, so as to cook the other side, without the fish falling apart.

Other foods to a greater or lesser extent suffer the same problem but are more readily manageable since the texture of the food being cooked has more "body" to it, thus, permitting proper manipulation of the food during the cooking process by a turner, tongs, spatula or the like.

BRIEF DESCRIPTION OF THE INVENTION

It is therefore an object in this invention to provide means for "unsticking" food from the grill rack while cooking. This is achieved by vertically moving adjacent grilling racks having support members for supporting food for cooking, so that one rack may be periodically disposed into an elevated position relative to the other, hence, "lifting" the food item being cooked intermittently from one grill rack onto the other and visa versa.

It is contemplated therefore, that a compound grill rack, for grilling food, that comprises:

(a) two interleaving racks, each rack carrying a family of spatially disposed support members in a common plane so that a support member of one family is adjacent to that of another family; and, (b) means for vertically moving one of said racks relative to the other so as to pass said one rack through said other rack into a superadjacent plane relative thereto, whereby, said other rack now becomes a bearing surface for said food.

DETAILED DESCRIPTION OF THE INVENTION

The invention will now be described by way of example and reference to the accompanying drawings in which.

Figure 1:
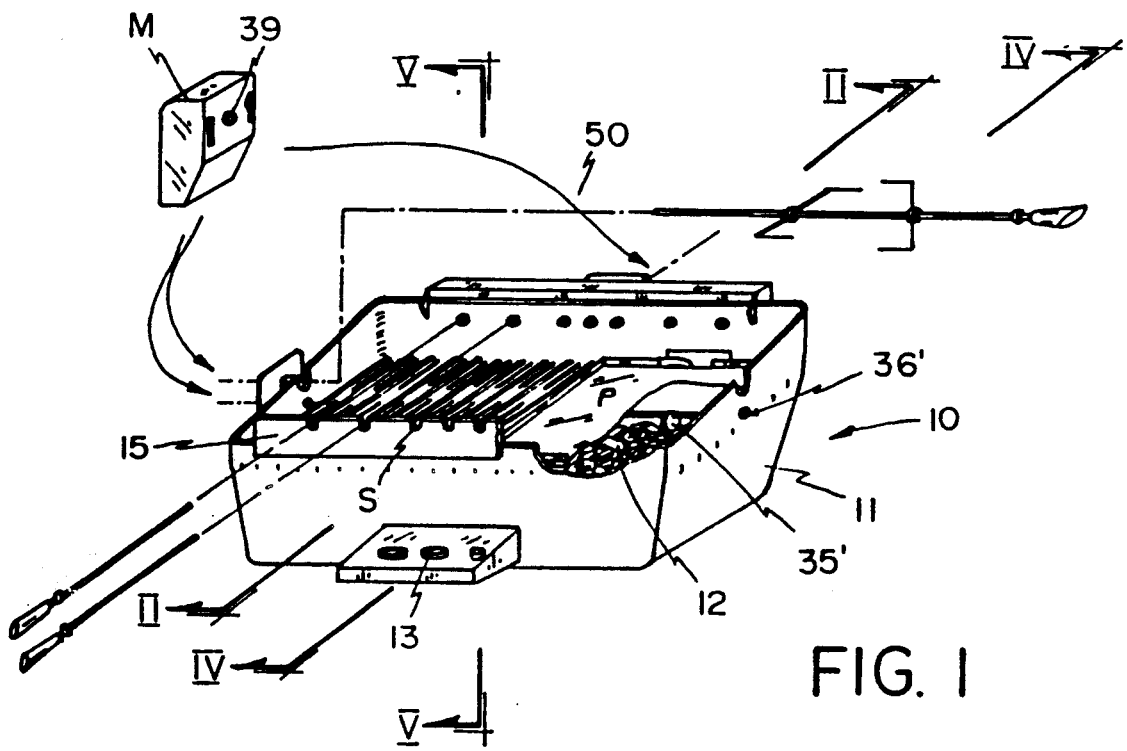
FIG. 1 is a perspective view of a gas fired barbecue according to the invention.

Referring to FIG. 1, a gas fired barbecue 10 consists of an outer housing 11, a coal or lava rock bed 12 and a gas control valve 13 for regulating the flow of propane or natural gas for firing the coal or lava rock bed 12 and heating the same.

Figure 3:
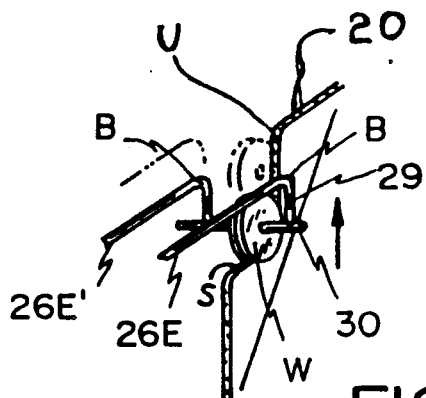
FIG. 3 is a section along line 3—3 of FIG. 2.
Figure 5:
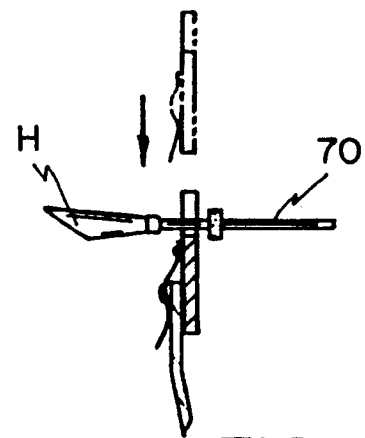
FIG. 5 is a section along line 5—5 of FIG. 1.
Figure 4:
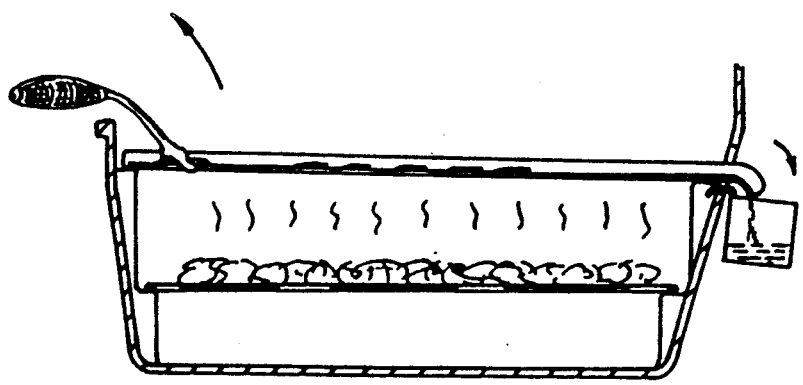
FIG. 4 is a section along line 4—4 of FIG. 1.
Figure 6:
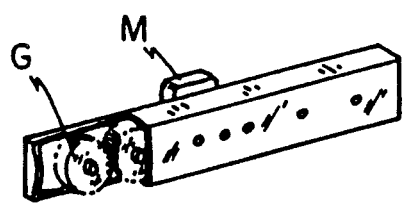
FIG. 6 is a partially broken-away perspective view of the gearing arrangement for shish-kabob rotation, according to the invention.

The compound grill rack, according to the invention, is generally shown as 15 and consists of a (first) fixed rack 16 having a plurality of spatially disposed parallel rod-like members 17, which act co-operatively as a fixed cooking plane. The ends of the first fixed cooking rack 16 flare into end support rods 18 that are welded onto a laterally extending support rod 19 which rests on an internal landing 20, formed in the inner front and rear walls of the barbecue housing 11 near the four corners thereof. The landing 20, and now referring to FIG. 3, terminates at its inner edge into an upriser U of a step S.

A (second) movable rack 25 similarly fashioned to the first, consists of a plurality of spatially disposed rod-like food supporting members 26 which act as a second family of rod-like food supporting members interspaced between the first member 17. Each of the rod-like members 26 have their respective ends, in referring to FIG. 3, bent at a bend B and terminate on a laterally extending rod 30.

Figure 2:
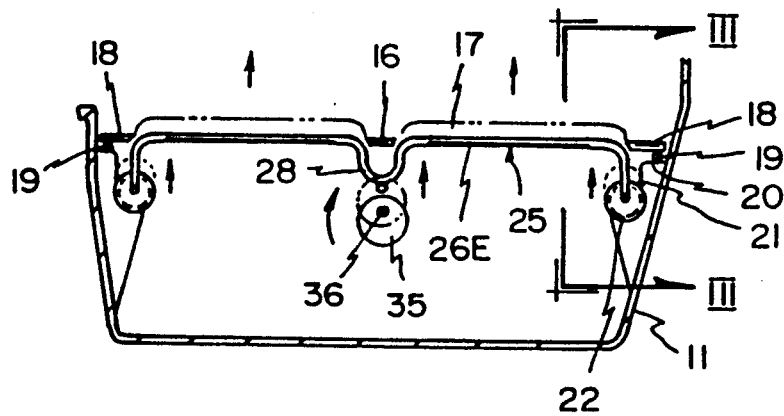
FIG. 2 is a section along lines 2—2 of FIG. 1.

At opposite ends, adjacent pairs of supporting members 26 (shown in FIG. 3 as 26E and 26E') carry between them, a wheel W which is adapted to rotate on the lateral rod 30, the wheel having a concave perimeter so as to ride up and down the upriser U. Each of these pairs of end rods 26E have, at their respective centre, a downward semi-circular bend 28 which makes a continual bearing connection against an eccentric wheel 35 attached to the axis 6, for rotation thereof. The axis 36 extends through the ends of the housing as at 36' and one end thereof, inserts into the mating aperture 39 of a prime mover or electrical motor M. The motor M therefore, can rotate the axis 36 and the eccentric 35 causing the second movable rack 25, and now referring to FIG. 2, to move into the phantom position as shown. Thus, as the eccentric 36 is rotated by the rotation of the motor shaft 39 and axis 36, the perimeter of the eccentric bears against the bend 28 causing the second rack 25 to rise and fall from the solid into the phantom position, as shown in FIG. 2, on each successive revolution of the motor. The second movable rack 25 therefore, lifts the cooking item off the first rack 16 and because the revolution of the eccentric 25 is slow, approximately four revolutions per minute, the food is "unstuck".

Where fish or meat are not to be cooked but one wishes shish-kabob, and now referring to FIG. 1, the motor is removed and place into location 50 and makes direct connection to a shaft, not clearly shown, which engages a centre wheel or gear and there are a plurality of spatially disposed gears G thereon which intermesh and cause each of these shish-kabob items to counter-rotate relative to the adjacent one. The shish-kabob itself has a shish-kabob rod 70 whose distal end mates into a configured orifice in the face of each gear G and thereby rotates the same while its opposite proximate end has a handle H and a shaft sits in an arcuate seat S spatially disposed along the upper margin of the forward end plate of the rack 15.

Referring to FIG. 1, a grill plate G is shown as capable of being inserted and to rest and sit upon the landings 20 and to be held thereby, in lieu of the movable rack 15.

We claim:

1. A compound grill rack, for grilling food, that comprises:

(a) two interleaving racks, each rack carrying a family of spatially disposed support members in a common plane so that a support member of one family is adjacent to that of another family; and, (b) means for vertically moving one of said racks relative to the other so as to pass said one rack through said other rack into a superadjacent plane relative thereto, so said other rack now becomes a bearing surface for said food.

2. The compound grill rack as claimed in claim 1, wherein means (b) moves one of said racks from a plane subjacent said other rack into a plane superadjacent said other rack.

3. The compound gill rack as claimed in claim 1, wherein said means (b) cyclically moves the said rack between superadjacent and subjacent planes.

4. The compound grill rack as claimed in claim 3, wherein said rack is moved between said plane approximately four revolutions per minute.

5. The compound grill rack as claimed in. claim 1, wherein means (b) includes a prime mover having a shaft and an eccentric thereon, the said eccentric having a perimeter bearing surface, and said rack having means adapted for engagement on the bearing surface whereby rotation of the eccentric by the prime mover causes said rack to move between said planes.

6. The compound grill rack as claimed in claim 2, wherein means (b) includes a prime mover having a shaft and an eccentric thereon, the said eccentric having a perimeter bearing surface, and said rack having means adapted for engagement on the bearing surface whereby rotation of the eccentric by the prime mover causes said rack to move between said planes.

7. The compound grill rack as claimed in claim 3, wherein means (b) includes a prime mover having a shaft and an eccentric thereon, the said eccentric having a perimeter bearing surface, and said rack having means adapted for engagement on the bearing surface whereby rotation of the eccentric by the prime mover causes said rack to move between said planes.

* * * * *